United States Patent
Ishida

(10) Patent No.: US 7,563,545 B2
(45) Date of Patent: Jul. 21, 2009

(54) HOLOGRAM TRANSFER SHEET AND INTERMEDIATE TRANSFER RECORDING MEDIUM

(75) Inventor: Tadahiro Ishida, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 592 days.

(21) Appl. No.: 10/559,324

(22) PCT Filed: Jun. 3, 2004

(86) PCT No.: PCT/JP2004/008061

§ 371 (c)(1), (2), (4) Date: Dec. 2, 2005

(87) PCT Pub. No.: WO2004/108433

PCT Pub. Date: Dec. 16, 2004

(65) Prior Publication Data

US 2006/0127623 A1 Jun. 15, 2006

(30) Foreign Application Priority Data

Jun. 4, 2003 (JP) ............................. 2003-159370

(51) Int. Cl.
*G03H 1/02* (2006.01)
(52) U.S. Cl. .................... 430/1; 430/2; 359/3
(58) Field of Classification Search ........ None
See application file for complete search history.

(56) References Cited

U.S. PATENT DOCUMENTS

| | | | | | |
|---|---|---|---|---|---|
| 4,288,479 | A | * | 9/1981 | Brack | 428/40.5 |
| 4,856,857 | A | * | 8/1989 | Takeuchi et al. | 359/3 |
| 6,308,630 | B1 | * | 10/2001 | Kurokawa et al. | 101/492 |
| 2002/0061451 | A1 | * | 5/2002 | Kita et al. | 430/2 |
| 2006/0240202 | A1 | * | 10/2006 | Ishida | 428/32.51 |
| 2008/0152875 | A1 | * | 6/2008 | Tomita et al. | 428/195.1 |

FOREIGN PATENT DOCUMENTS

| | | | |
|---|---|---|---|
| GB | 2225583 | * | 6/1990 |
| JP | 01-215832 A | | 8/1989 |
| JP | 02-194078 A | | 7/1990 |

(Continued)

*Primary Examiner*—Martin J Angebranndt
(74) *Attorney, Agent, or Firm*—Ladas & Parry LLP

(57) ABSTRACT

It is an object of the invention is to provide a hologram transfer sheet comprising: at least, a peelable layer; a relief formation layer having a relief; and a metal thin layer, which are sequentially formed on a substrate, capable of preventing a crack or discoloration of the metal thin layer which may be caused by heat or stress when a transfer layer is aligned with and transferred onto a transfer receiving body or preventing a disfigurement of the external appearance which may be caused by a crack mark of the metal thin layer following the thermal deformation of the substrate when performing an entire surface transfer by means of a heat roller. Such a hologram transfer sheet (1) comprising: at least, a peelable layer (3); a relief formation layer (4) having a relief; and a metal thin layer (5), which are sequentially formed on a substrate (2), is characterized in that the peelable layer (3) is made of a norbornene-based resin having a chemical structure containing a norbornene structure at least. The peelable layer preferably contains a resin incompatible with such a norbornene-based resin at a ratio from 5 to 30% by weight relative to a total solid content.

5 Claims, 1 Drawing Sheet

FOREIGN PATENT DOCUMENTS

| | | |
|---|---|---|
| JP | 05-011676 A | 1/1993 |
| JP | 06-255268 A | 9/1994 |
| JP | 07-199782 A | 8/1995 |
| JP | 2001-180192 A | 7/2001 |
| JP | 2001-191624 A | 7/2001 |
| JP | 2002-90276 A | 3/2002 |
| JP | 2002-127622 A | 5/2002 |
| JP | 2002-200852 A | 7/2002 |
| JP | 2002-235054 A | 8/2002 |

* cited by examiner

HOLOGRAM TRANSFER SHEET AND INTERMEDIATE TRANSFER RECORDING MEDIUM

This application is a U.S. National Phase of International Patent Application Ser. No. PCT/JP2004/008061, filed Jun. 3, 2004 which claims priority to Japanese Patent Application No. 2003-159370 filed Jun. 4, 2003.

TECHNICAL FIELD

The present invention relates to a hologram transfer sheet in which a peelable layer, a relief formation layer and a metal thin layer are formed in this order on a substrate. More specifically, the present invention relates to a hologram transfer sheet which prevents a crack or discoloration of the metal thin layer and thereby prevents a disfiguration of the external appearance, which may be caused by heat or stress (stress against pressure, tension, shearing force and so on) when a hologram transfer portion is transferred to a transfer receiving body. The present invention further relates to an intermediate transfer recording medium provided with a dye receiving layer on the metal thin layer of such a hologram transfer sheet.

BACKGROUND ART

A hologram transfer sheet having an optical diffraction structure is conventionally known, which is used when various kinds of pictures, marks and designs are displayed partially or wholly on a surface of a transfer receiving body such as a credit card, a cash card, a portfolio, a packaging and so on by means of a hologram, a diffraction grating or the like. As an example of such a hologram transfer sheet, Japanese Patent Application Laid-Open No. 2002-90276 discloses a hologram transfer sheet in which a peelable layer, a hologram formation layer, a reflective metal thin layer and a thermal adhesion layer are formed in this order on a substrate film.

Also, Japanese Patent Application Laid-Open No. H06 (1995)-255268 discloses a thermal transfer sheet (an intermediate transfer recording medium) provided with an image receiving adhesive layer having thermal adhesiveness relative to a transfer receiving body, in which a sublimation transferred image is formed on a transparent metal thin layer of such a hologram transfer sheet.

In the case that an optical diffraction structure such as a hologram or a diffraction grating is transferred onto a transfer receiving body such as a credit card, a cash card or the like by means of such a hologram transfer sheet, the hologram or the diffraction grating with a metallic luster due to the metal thin layer can be formed on the transfer receiving body by aligning the hologram transfer sheet with the transfer receiving body and thermocompressing from the substrate film side of the hologram transfer sheet. However, heat or stress (stress against pressure, tension, shearing force and so on) during the thermocompressing may cause a crack or discoloration of the metal thin layer. Especially, in the case of performing an entire surface transfer by means of a heat roller or the like, the deformation of the substrate is caused by heat, and thereby the crack of the metal thin layer is caused. This results in an appearance of an undesirable mark, which disfigures the external appearance of the hologram transfer portion.

The present invention has been accomplished in view of the above problems. It is therefore an object of the present invention to provide a hologram transfer sheet provided with at least a peelable layer, a relief formation layer having a relief and a metal thin layer, which are formed in this order on a substrate (i.e. a hologram transfer sheet provided with a transfer layer formed on a substrate and having a relief structure such as a hologram and/or a diffraction grating), capable of preventing a crack or discoloration of the metal thin layer which may be caused by heat or stress (stress against pressure, tension, shearing force and so on) when the hologram transfer sheet is aligned with the transfer receiving body to transfer the transfer layer onto the transfer receiving body, and also preventing the disfiguration of the external appearance which may be caused by an undesirable mark due to the crack of the metal thin layer following the deformation of the substrate which may be caused by heat in the case of performing an entire surface transfer by means of a heat roller or the like. It is also an object of the present invention to provide an intermediate transfer recording medium provided with a dye receiving layer on the metal thin layer of such a hologram transfer sheet.

DISCLOSURE OF INVENTION

The above object is achieved by the present invention which is a hologram transfer sheet comprising: at least, a peelable layer; a relief formation layer having a relief; and a metal thin layer, which are sequentially formed on a substrate, wherein the peelable layer is made of a norbornene-based resin having a chemical structure containing a norbornene structure at least. By using such a norbornene-based resin having a chemical structure containing a norbornene structure, it becomes possible to prevent a crack or discoloration of the metal thin layer which may be caused by heat or stress when a hologram transfer portion is transferred, and thereby prevent a disfigurement of the external appearance.

In the present invention, the peelable layer contains a resin incompatible with the norbornene-based resin at a ratio from 5 to 30% by weight relative to a total solid content of the peelable layer. Thereby, a plurality of particles or microdomains is formed and dispersed in the peelable layer. As a result, the peelability is improved when the hologram transfer portion is transferred, the transfer irregularity is eliminated, and the sharpness of the transferred edge portion is improved.

In the present invention, the relief of the relief formation layer is a relief hologram and/or a diffraction grating.

In the present invention, a heat resistant antifriction layer is provided on a surface of the substrate on the side opposite to the peelable layer.

In the present invention, an adhesive layer is provided on the metal thin layer.

Furthermore, the above object is achieved by the present invention which is an intermediate transfer recording medium wherein a dye receiving layer is provided as an outermost layer on such a metal thin layer.

BEST MODE FOR CARRYING OUT THE INVENTION

Now, a specific explanation is made on the embodiments for carrying out the invention.

Figure 1:
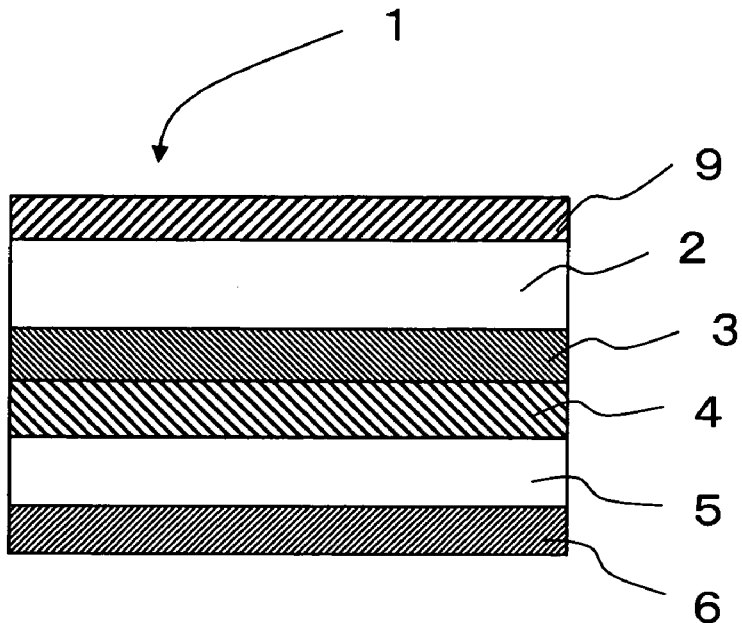
FIG. 1 is a schematic view illustrating an embodiment of the hologram transfer sheet of the present invention.

The hologram transfer sheet 1 illustrated in FIG. 1 is provided with: a peelable layer 3; a relief formation layer 4; a metal thin layer 5; and an adhesive layer 6, which are formed in this order on a surface of a substrate 2, and further provided with a heat resistant antifriction layer 9 formed on another surface of the substrate 2.

Figure 2:
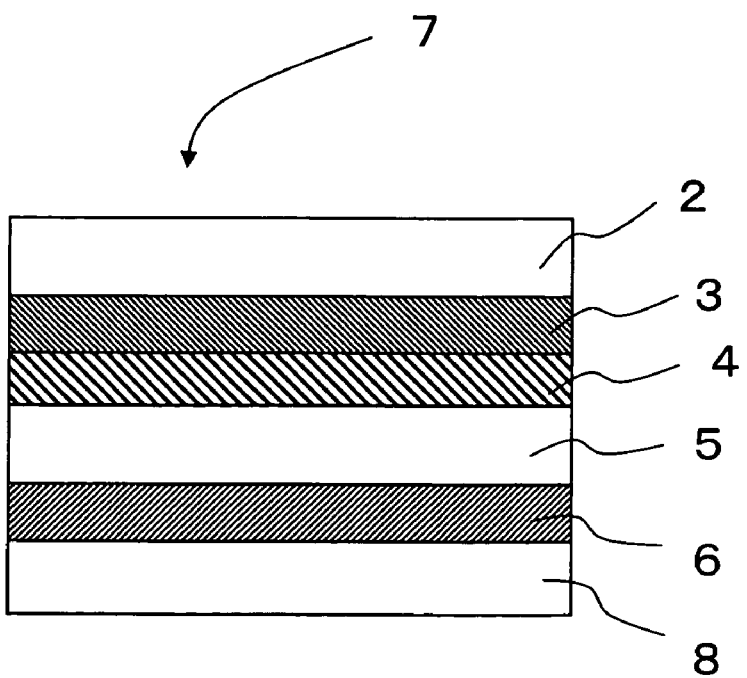
FIG. 2 is a schematic view illustrating an embodiment of the intermediate transfer recording medium of the present invention.

The intermediate transfer recording medium 7 illustrated in FIG. 2 is provided with: a peelable layer 3; a relief formation layer 4; a metal thin layer 5; an adhesive layer 6 and a dye receiving layer 8, which are formed in this order on a substrate 2. The dye receiving layer 8 is aligned with a thermal transfer sheet provided with a dye layer, which is formed on a substrate, containing a thermal sublimation dye, and heated correspondingly to the image information, so that a thermal transferred image of dye is formed on the dye receiving layer 8. A surface of the dye receiving layer 8 where the dye is received is aligned with a transfer receiving body, and thermocompressed to transfer a plurality of layers including the peelable layer, the relief formation layer, the metal thin layer, the adhesion layer and the dye receiving layer onto the transfer receiving body, so that an image product is obtained.

Now, a specific explanation is made on each layer constituting the hologram transfer sheet and the intermediate transfer recording medium of the present invention.

(Substrate)

The substrate 2 is not limited to any special kind, and may be a conventional substrate which is used for a conventional hologram transfer sheet or intermediate transfer recording medium. Specific examples of the preferred substrate includes: a thin paper such as a glassine paper, a condenser paper or paraffin paper; or a drawn or undrawn film of a plastic including: a highly heat resistant polyester such as polyethylene terephthalate, polyethylene naphthalate, polybutylene terephthalate, polyphenylene sulfide, polyether ketone or polyether sulfone; polypropylene; polycarbonate; cellulose acetate; polyethylene derivatives; polyvinyl chloride; polyvinylidene chloride; polystyrene; polyamide; polyimide; polymethylpentene; ionomers and so on. Also, a composite film obtained by laminating two or more kinds of these materials may be used. A thickness of the substrate can be selected depending on materials so as to obtain the suitable strength, heat resistance and so on. Usually, about 1 to 100 μm is preferable.

(Peelable Layer)

The peelable layer 3 of the hologram transfer sheet is made of a norbornene-based resin having a chemical structure containing a norbornene structure at least. Furthermore, it is preferable to use a resin incompatible with such a norbornene-based resin at a ratio of 5 to 30 wt. % (weight percent) relative to a total solid content of the peelable layer. Once the resin incompatible with the norbornene-based resin is added, a plurality of particles or microdomains is formed and dispersed in the peelable layer. This improves the peelability on transferring the hologram. Thereby, the transfer irregularity can be avoided, and the sharpness of the transferred edge portion can be improved.

The norbornene-based resin contained in the peelable layer is a polymer or copolymer having a chemical structure containing a unit including a norbornene structure at least as a repeating unit, or a composition containing one or more monomers including a norbornene structure at least and capable of deriving a polymer having a chemical structure containing a unit including a norbornene structure via a polymerization.

In this context, the "norbornene structure" means a chemical structure having a skeleton structure represented by the following formula (1'). The unit or monomer having such a norbornene structure may have a substituent on the ring. Such a substituent may bond to another substituent to form a ring.

Also, before the polymerization, the unit or monomer having such a norbornene structure has a polymerizable functional group such as an ethylenically unsaturated bond.

Formula (1')

(1')

As the norbornene-based resin having the chemical structure containing the norbornene structure and contained in the peelable layer, a compound having a repeating unit represented by the following general formula (1) is preferably used.

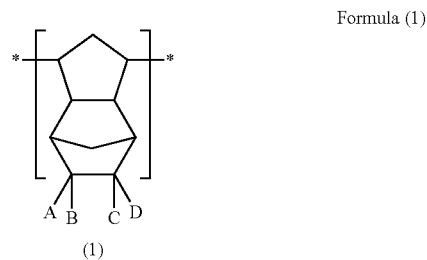

Formula (1)

(1)

In the above formula, A, B, C and D is independently an hydrogen atom, a hydrocarbon radical having 1 to 10 carbon atoms, a halogen atom, a hydrocarbon radical having 1 to 10 carbon atoms substituted by one or more halogen atoms, $-(CH_2)_nCOOR^1$, $-(CH_2)_nOCOR^1$, $-(CH_2)_nOR^1$, $-(CH_2)_nCN$, $-(CH_2)_nCONR^3R^2$, $-(CH_2)_nCOOZ$, $-(CH_2)_nO-COZ$, $-(CH_2)_nOZ$, $-(CH_2)_nW$. B and C may form together $-OC-O-CO-$, $-OC-NR^4-CO-$, or a monocyclic or polycyclic alkylene group. $R^1$, $R^2$, $R^3$ and $R^4$ is independently a hydrocarbon radical having 1 to 20 carbon atoms. Z is a hydrocarbon radical substituted by one or more halogen atoms. W is $SiR^5_pF_{3-p}$ ($R^5$ is a hydrocarbon radical having 1 to 10 carbon atoms, F is a halogen atom, $-COOR^6$, $-OCOR^6$ or $-OR^6$ ($R^6$ is a hydrocarbon radical having 1 to 10 carbon atoms), p is an integer from 0 to 3. N (actually, designated as the lowercase "n" in the formula) is an integer from 0 to 10.

The resin having the polynorbornene skeleton as described above is classified as an amorphous polyolefin resin, in view of the resin structure. The number average molecular weight is preferably in a range from 50000 to 300000. A specific example may be ARTON G, ARTON F, ARTON I and the like available from JSR Corporation.

In the case that the hologram; which is transferred onto the transfer receiving body such as a card or the like from the hologram transfer sheet or the intermediate transfer recording medium of the present invention, is observed from the transfer receiving body side, the peelable layer is not necessarily required to be transparent. On the other hand, in the case that the hologram, which is transferred onto the transfer receiving body, is observed from the hologram layer side, the relief formation layer is required to be viewed through the peelable layer. In the latter case, therefore, the norbornene-based resin is required to have the transparency to such an extent that the hologram achieved by the relief can be observed. From such a viewpoint, the norbornene-based resin preferably has the optical transparency of 90% or more. In this regard, since the norbornene-based resin generally has a high transparency, it usually has the transparency of such an extent that the relief formation layer after the transfer can be viewed therethrough.

Also, the norbornene-based resin preferably has a heat resistance against a temperature environment more than about 160° C.

In this present invention, a resin incompatible with the norbornene-based resin may be added and mixed with the norbornene-based resin.

The resin incompatible with the norbornene-based resin is not limited to any special resin, insofar as it cannot be dissolved completely in an addition polymerization type norbornene-based resin. The incompatibility is determined according to the ordinary method of the resin industry. For example, a sample containing at least one domain or particle sized 1 $mm^2$ (square millimeter) or more in an area sized 10 cm by 15 cm can be defined as "incompatible", when a composition obtained by dissolving and mixing a compound of 5 parts by weight in and with a norbornene-based resin of 100 parts by weight is observed with an electron microscope at 100000-fold magnification.

Specifically, as the resin incompatible with the norbornene-based resin, a resin other than the addition type norbornene-based resin is typically used. Such a resin incompatible with the norbornene-based resin may be: for example, a polyether or polythioether such as polyphenylene sulfide, polyphenylene ether or the like; a polyester-based polymer such as aromatic polyester, polyalylate, polyethylene terephthalate, polybutylene terephthalate, polycarbonate, polyetherketone or the like; a chain polyolefin-based polymer such as polyethylene, polypropylene, poly-4-methyl-pentene-1 or the like; a commodity transparent resin such as polymethyl methacrylate, cyclohexyl methacrylate-methyl methacrylate copolymer, polyacrylonitrile styrene (AS resin) or the like; an acrylic resin; a MS resin; a liquid crystal plastic; and so on.

Typically, in the case that the resin incompatible with the norbornene-based resin (hereinafter referred to as "incompatible resin") is added, a plurality of microdomains or particles are formed and dispersed in a coated film formed by coating the mixture containing the incompatible resin. In the case that the microdomains are formed, the transparency of the film, and the transformability when the hologram is thermally transferred from the hologram transfer sheet to the transfer receiving body, are preferably improved, if an average particle size of domains observed with an electron microscope [("long diameter"+"short diameter")/2] is usually 5 to 30 μm, preferably 10 to 20 μm.

In the peelable layer of the present invention, the incompatible resin is contained preferably at 5 to 30 wt. % relative to a total solid content of the peelable layer. In the case that the incompatible resin are contained in the range above described, it is possible to obtain a good balance among the heat resistance and the transparency of the peelable layer, and the transformability when the hologram is thermally transferred to the transfer receiving body.

The addition of the incompatible resin is for improving the sharpness of the edge of the transferred hologram layer (so-called "hakugire" property) when the sheet is peeled. If the content ratio of the incompatible resin is less than 5 wt. %, the hakugire property becomes worse. On the other hand, if the content ratio of the incompatible resin is more than 30 wt. %, the incompatibility makes the coating property worse, or the crack of the metal thin layer arises following the thermal deformation of the substrate. Therefore, the incompatible resin is contained preferably at 5 to 20 wt. % relative to the total solid content of the peelable layer.

The peelable layer can be formed by preparing a coating solution obtained from a mixture of the norbornene-based resin, the incompatible resin, the solvent, and optionally the additives such as waxes or surfactants, and coating and drying the prepared solution by means of a known method such as a gravure printing, a screen printing or a reverse coating using a gravure plate. A thickness of the peelable layer is usually about 0.1 to 2 μm at a dry state.

(Relief Formation Layer)

The relief formation layer 4 of the hologram transfer sheet of the present invention is a layer having a hologram microasperity formed on one surface of a synthesized resin layer. The hologram is a typical example of an optical diffraction structure, and includes a plane hologram and a volume hologram, both of which are usable. Specific examples include: a relief hologram, a Lippmann hologram, a Fresnel hologram, a Fraunhofer hologram, a lensless Fourier-transform hologram, a laser hologram (e.g. image hologram), a white light hologram (e.g. rainbow hologram), a color hologram, a computer hologram, a hologram display, a multiplex hologram, a holographic stereogram, a holographic diffraction grating, and so on. The optical diffraction structure such as the hologram or the diffraction grating can be transferred onto the transfer receiving body from the hologram transfer sheet of the present invention.

The synthesized resin for the relief formation layer may be a thermosetting resin such as unsaturated polyester, melamine, epoxy, polyester(meth)acrylate, urethane(meth)acrylate, epoxy(meth)acrylate, polyether(meth)acrylate, polyol(meth)acrylate, melamine(meth)acrylate or triazine-based acrylate, in addition to a thermoplastic resin such as polyvinyl chloride, acrylic resin (e.g. PMMA), polystyrene or polycarbonate. The above listed thermosetting or thermoplastic resin may be used solely. Alternatively, the thermosetting resin and the thermoplastic resin may be used as a mixture. Furthermore, a thermoforming material having a radical polymerizing unsaturated bond, or an ionizing radiation curable material obtained by adding a radical polymerizing unsaturated monomer to the above listed material may be used, for example. Other photosensitive materials such as silver salt, gelatin dichromate, TPE (thermoplastic elastomer), diazo-based photosensitive material, photoresist, ferroelectrics, photochromics, thermochromics, chalcogen glass and so on may be also used. In the context, "(meth)acrylate" means "acrylate" and/or "methacrylate".

The hologram can be formed onto the layer made of the above listed resin or resins by a known method. For example, in the case that interference fringes of the hologram or the diffraction grating are recorded as a relief of the surface asperity, an original plate on which the interference fringes or the diffraction grating are recorded as the relief of the surface asperity is used as a press die, and the original plate is aligned with and placed over the above-mentioned resin layer. Then, the original plate and the resin layer are thermocompressed by means of an appropriate device such as a heat roll, so that the surface asperity of the original plate is reproduced. In the case that a photopolymer is used, the photopolymer is coated on the hologram transfer sheet, and then the original plate is aligned therewith. The transfer sheet coated with the photopolymer is irradiated with laser beam via the original plate, so that the surface asperity of the original plate is reproduced.

A thickness of such a relief formation layer is preferably 0.1 to 6 μm, more preferably 0.1 to 4 μm.

(Metal Thin Layer)

If a metal thin film capable of reflecting a light is used as the metal thin layer 5 of the hologram transfer sheet, an opaque type hologram is obtained. On the other hand, if a transparent material having a refractive index considerably different from that of the hologram layer, a transparent type hologram is obtained. Either type can be used in the present invention.

The metal thin layer can be formed by a known method such as sublimation, a vacuum deposition, a sputtering, a reactive sputtering, an ion plating, an electroplating and so on.

The metal thin layer constituting an opaque type hologram may be, for example, a metal such as Cr, Ti, Fe, Co, Ni, Cu, Ag, Au, Ge, Al, Mg, Sb, Pb, Pd, Cd, Bi, Sn, Se, In, Ga, Rb and so on; an oxide, nitride of such a metal. The metal thin layer may be formed from one of the above listed metals, or may be formed from a combination of two or more kinds among them. Among the above listed metals, Al, Cr, Ni, Ag and Au are especially preferable, and the film thickness thereof is 1 to 10000 nm, preferably 20 to 200 nm.

The metal thin layer constituting a transparent type hologram is not limited to any material, insofar as it is an optically transparent material capable of showing the hologram effect. For example, a transparent material having a refractive index different from that of the resin for the relief formation layer may be used. In this case, the refractive index of the metal thin layer may be larger or may be smaller than that of the resin for the relief formation layer. However, the difference between the two refractive indexes is preferably 0.1 or more, more preferably 0.5 or more, optimally 1.0 or more.

In addition to the above listed metal materials, a reflective metal film having a thickness less than 20 nm can be used for the transparent type hologram. A suitable material for the transparent type reflective layer may be titanium oxide ($TiO_2$), zinc sulfide (ZnS), a Cu—Al composite metal oxide and so on.

(Adhesive Layer)

The adhesive layer 6 is for bonding securely the hologram with the transfer receiving body. As the adhesive layer, various known adhesives may be used including acrylic resin, urethane resin, amide resin, epoxy resin, rubber-based resin, ionomer resin and so on. A thickness of the adhesive layer is 0.1 to 50 μm, preferably 1 to 10 μm.

However, if the surface of the transfer receiving body is made of an adhesive material, there is no need to further provide the adhesive layer.

(Heat Resistant Antifriction Layer)

The hologram transfer sheet of the present invention may be provided with a heat resistant antifriction layer 9, if necessary, on a surface opposite to another surface on which the peelable layer, the relief formation layer and the metal thin layer are formed, in order to avoid sticking or wrinkle which may be caused by heat of a thermal head, heat roll or the like when the hologram portion is transferred onto the transfer receiving body. The resin for the heat resistant antifriction layer may be a known material such as polyvinyl butyral resin, polyvinyl acetoacetal resin, polyester resin, vinyl chloride-vinyl acetate copolymer, polyether resin, polybutadiene resin, styrene-butadiene copolymer, acrylic polyol, polyurethane acrylate, polyester acrylate, polyether acrylate, epoxy acrylate, urethane or epoxy prepolymer, nitrocellulose resin, cellulose nitrate resin, cellulose acetopropionate resin, cellulose acetate butyrate resin, cellulose acetate hydrodiene phthalate resin, cellulose acetate resin, aromatic polyamide resin, polyimide resin, polycarbonate resin, chlorinated polyolefin resin and so on.

A lubricant which is to be added to or coated on the heat resistant antifriction layer made of the above listed resin material may be phosphoric ester, silicone oil, graphite powder, silicone-based graft polymer, fluorine-based graft polymer, and a silicone polymer such as acrylic silicone graft polymer, acrylic siloxane, aryl siloxane and the like. The suitable lubricant may be a compound made of: a polyol such as a polyalcoholic high molecular compound; a polyisocyanate compound; and a phosphoric ester-based compound. Furthermore, a filler may be preferably added.

The heat resistant antifriction layer can be formed by dissolving or dispersing the above listed resin, the above listed lubricant and the filler in an appropriate solvent to prepare an ink for forming the heat resistant antifriction layer, and coating the prepared ink on a rear surface of the above-mentioned substrate by a method such as a gravure printing, a screen printing, a reverse coating using a gravure plate, and then drying the coated ink.

Hereinafter, a detail explanation is made on the intermediate transfer recording medium provided with a dye receiving layer on the metal thin layer of the hologram transfer sheet.

(Dye Receiving Layer)

The intermediate transfer recording medium 7 of the present invention is provided with a dye receiving layer 8 on the metal thin layer of the above-mentioned hologram transfer sheet. In this regard, if the dye receiving layer itself has the adhesiveness, the dye receiving layer can be provided directly on the metal thin layer. However, the adhesive layer 6 as mentioned above is usually provided between the metal thin layer and the dye receiving layer in order to improve the adhesion therebetween.

The dye receiving layer is provided as a part of a transfer portion constituting the intermediate transfer recording medium so as to be an outermost surface of the transfer portion. On the dye receiving layer, an image is formed from the thermal transfer sheet having a colorant layer by a thermal transfer method. Then, the transfer portion of the intermediate transfer recording medium on which the image is formed is transferred onto the transfer receiving body, so that an image product is obtained. For this purpose, as a material for the dye receiving layer, there is used a known material which is receptive to a thermal transferring colorant such as a sublimation dye or thermofusible ink selected for the image formation. For example, it is preferable to use: a polyolefin resin such as polypropylene; a halogenated resin such as polyvinyl chloride or polyvinylidene chloride; a vinyl-based resin such as polyvinyl acetate, a copolymer based on vinyl chloride-vinyl acetate, ethylene-vinyl acetate copolymer or polyacrylic ester; a polyester resin such as polyethylene terephthalate or polybutylene terephthalate; a polystyrene-based resin; a polyamide-based resin; a copolymer-based resin made of olefin such as ethylene or propylene and other vinyl monomer; an ionomer; a cellulose-based resin such as cellulose diacetate; polycarbonate and so on. Especially, vinyl chloride-based resin, acrylic styrene-based resin or polyester resin is preferable.

In the case that the dye receiving layer is transferred onto the transfer receiving body via the adhesive layer, the dye receiving layer does not always need to be adhesive. In the case that the dye receiving layer is transferred onto the transfer receiving body without using any adhesive layer, however, the dye receiving layer is preferably formed from a resin material having thermal adhesiveness such as vinyl chloride-vinyl acetate copolymer. The dye receiving layer can be formed by dissolving or dispersing one or more materials selected from the above listed materials, and optionally various additives and the like in an appropriate solvent such as water or an organic solvent to prepare a coating solution for the dye receiving layer, and coating the prepared coating solution by a gravure printing, a screen printing or a reverse coating using a gravure plate and then drying the coated solution. A thickness of the coated layer is 1 to 10 µm at a dry state.

Embodiments described above are for a purpose of illustration, and are intended to encompass anything having substantially the same construction and the same effect as the technical range disclosed in the claims of the present application in the technical range of the present invention.

As described above, the present invention is a hologram transfer sheet provided with: at least, a peelable layer; a relief formation layer having a relief; and a metal thin layer, which are sequentially formed in this order on a substrate, wherein the peelable layer is made of a norbornene-based resin having a chemical structure containing a norbornene structure at least. By using such a norbornene-based resin having the chemical structure containing the norbornene structure, it is possible to prevent the crack or discoloration of the metal thin layer which may be caused by heat or stress when a hologram is transferred and thereby prevent the disfigurement of the external appearance.

Also, if a resin incompatible with such a norbornene-based resin is contained in the peelable layer at a ratio of 5 to 30 wt. % relative to a total solid content of the peelable layer, a plurality of particles or microdomains is formed and dispersed in the peelable layer, so that the peelability is improved and the transfer irregularity is eliminated, when the hologram is transferred, and the sharpness of the transferred edge portion is improved.

EXAMPLES

The present invention will now be explained in detail with reference to Examples. In the following explanation, "part(s)" or "%" is on a weight basis unless otherwise noted.

Example 1

A polyethylene terephthalate (PET) film ("Lumirror" available from Toray Industries, Inc.) having a thickness 25 µm was used as a substrate. On one surface of the substrate, a peelable layer, a relief formation layer, a metal thin layer and an adhesive layer are sequentially formed in accordance with the following conditions to obtain a hologram transfer sheet of Example 1.

The peelable layer was formed in such a manner that a coating solution having the following composition was coated and dried by a gravure coating to obtain an after-dried thickness of 1.5 µm.

(Peelable Layer Coating Solution)
  Norbornene-based resin ("ARTON G" available from JSR Corporation) of 40 parts.
  Acrylic polyol resin of 10 parts.
  Methylethylketone/toluene (mass ratio=2/8) of 50 parts.

On the obtained peelable layer, a coating solution having the following composition was coated and dried by a gravure coating to obtain a relief formation layer having an after-dried thickness of 2.0 µm. The obtained relief formation layer was aligned with a nickel press die on which a hologram pattern is formed, and then heated and compressed to form a surface asperity on the relief formation layer, and thereby obtain a relief hologram.

(Relief Formation Layer Coating Solution)
  Acrylic resin of 100 parts.
  Urethane acrylate of 25 parts.
  Silicone of 1 part.
  Optical polymerization initiator of 5 parts.
  Methylethylketone of 100 parts.

Also, the obtained relief formation layer was coated with $TiO_2$ via a vacuum deposition method so as to obtain a metal thin layer having a thickness of 500 Å.

Furthermore, on the metal thin layer, a coating solution having the following composition was coated and dried by a gravure coating so as to obtain an adhesive layer having an after-dried thickness of 1.0 µm.

(Adhesive Layer Coating Solution)
  Vinyl chloride-vinyl acetate copolymer of 20 parts.
  Acrylic resin of 10 parts.
  Ethyl acetate of 20 parts.
  Toluene of 50 parts.

Example 2

A hologram transfer sheet of Example 2 was fabricated in the same manner as Example 1 except that the peelable layer coating solution for the hologram transfer sheet of Example 1 was changed to the following composition.

(Peelable Layer Coating Solution)
  Norbornene-based resin ("ARTON G" available from JSR Corporation) of 40 parts.
  Acrylic polyol resin of 10 parts.
  Polyethylene wax of 2.5 parts.
  Methylethylketone/toluene (mass ratio=2/8) of 50 parts.

Example 3

On the adhesive layer of the hologram transfer sheet fabricated by Example 2, a coating solution having the following composition was coated and dried by a gravure coating so as to obtain a dye receiving layer having an after-dried thickness of 3.0 µm, so that an intermediate transfer recording medium of Example 3 was obtained.

(Dye Receiving Layer Coating Solution)
  Vinyl chloride-vinyl acetate copolymer of 40 parts.
  Acrylic silicone of 1.5 parts.
  Methylethylketone of 50 parts.
  Toluene of 50 parts.

Comparative Example 1

A hologram transfer sheet of Comparative Example 1 was fabricated in the same manner as Example 1 except that the peelable layer coating solution for the hologram transfer sheet of Example 1 was changed to the following composition.

(Peelable Layer Coating Solution)
  Acrylic resin of 50 parts.
  Polyethylene wax of 2.5 parts.
  Methylethylketone/toluene (mass ratio=1/1) of 50 parts.

Comparative Example 2

The peelable layer coating solution was the same as Comparative Example 1 in the hologram transfer sheet of Example 1. Thereon, a coating solution having the following composition was coated and dried by a gravure coating so as to obtain a heat resistant intermediate layer having an after-dried thickness of 1.0 µm, so that a hologram transfer sheet of Comparative Example 2 was obtained.

(Heat Resistant Intermediate Layer Coating Solution)
 Acrylic polyol resin of 50 parts.
 Isocyanate of 30 parts.
 Ethyl acetate/toluene (mass ratio=1/1) of 50 parts.

Test 1

Each hologram transfer sheet obtained by Examples 1-2 and Comparative Examples 1-2 was aligned with a card of vinyl chloride as a transfer receiving body so as to contact the adhesive layer of each hologram transfer sheet with the card of vinyl chloride. Then, they are heated and compressed from a hologram transfer sheet side by means of a heat roller, so that a hologram was transferred onto the card of vinyl chloride.

In this case, a surface temperature of the heat roller was 175° C., and a feed speed of the heat roller was 1 inch/sec. The card of vinyl chloride had the following composition.

(Composition of Card of Vinyl Chloride)
 Polyvinyl chloride compound (degree of polymerization=800) of 100 parts (containing about 10% of additives such as stabilizer).
 White pigment (Titanium oxide) of 10 parts.
 Plasticizer (DOP) of 0.5 parts.

A surface of the card of vinyl chloride on which the hologram was transferred was observed with the naked eye in order to check a status of the metal thin layer.

(Result of Test 1)

With regard to the card of vinyl chloride on which the hologram was transferred from the hologram transfer sheet of Example 1 or 2, no crack or discoloration of the metal thin layer was observed. Thereby, the obtained card had a hologram effect without any problem.

On the contrary, with regard to the card on which the hologram was transferred from the hologram transfer sheet of Comparative Example 1, a streaky crack was observed in the metal thin layer. With regard to the card on which the hologram was transferred from the hologram transfer sheet of Comparative Example 2, cracks was observed over an entire surface of the transferred metal thin layer, and the irregularity of interference fringes was observed in the hologram. In Comparative Example 2, a highly cross-linkable intermediate layer was provided between the peelable layer having no heat resistance and the relief formation layer in order to avoid the thermal deformation. However, the crack of the metal thin layer could not be avoided. Thus, it was ensured that using a highly heat resistant material for the peelable layer is effective as seen in Examples 1 and 2.

Test 2

The hologram was transferred under the same conditions as in the hologram transfer as described above except that the surface temperature of the heat roller was varied by 10° C. within a range from 120 to 170° C. (i.e. 120° C., 130° C., 140° C., . . . ), so that a status of the metal thin layer was checked.

(Result of Test 2)

With regard to the hologram transfer sheet of Examples 1 and 2, no crack or discoloration of the metal thin layer was observed at any temperature within the range from 120 to 170° C. Thereby, any problem was not found.

With regard to the hologram transfer sheet of Comparative Example 1, cracks were observed in the metal thin layer at every temperature within the range from 120 to 170° C.

With regard to the hologram transfer sheet of Comparative Example 2, no crack was observed in the metal thin layer within a range from 120 to 140° C., but cracks were observed in the metal thin layer within a range from 150 to 170° C.

Test 3

With regard to the intermediate transfer recording medium fabricated by Example 3, a full color image of a facial portrait (a mirror image) was formed by transferring individual dyes onto the dye receiving layer of the intermediate transfer recording medium of Example 3, by means of a thermal printer for cards (a card printer CP510 available from Victor Data Systems Co., Ltd.) and a thermal transfer sheet provided with a standard dye layer for the card printer CP 510, according to each image information for yellow, magenta and cyan obtained from a color separation of the facial portrait.

Then, the dye receiving layer containing such an obtained thermal transferred image, the adhesive layer, the metal thin layer, the relief formation layer and the peelable layer were transferred onto the card of vinyl chloride the same as used in the above Test 1, under heat roller conditions the same as in the above Test 1 (the surface temperature was 175° C., and the feed speed was 1 inch/sec).

(Result of Test 3)

By using the intermediate transfer recording medium of Example 3, a card of vinyl chloride was obtained with superior quality in that it has a sublimation dye transferred image with a hologram effect without the crack or discoloration of the metal thin layer, and it allows a sophisticated design.

The invention claimed is:

1. A hologram transfer sheet comprising: at least, a peelable layer; a relief formation layer having a relief; and a metal thin layer, which are sequentially formed on a substrate,
 wherein the peelable layer is made of a norbornene-based resin having a chemical structure containing a norbornene structure at least; and
 further wherein the peelable layer contains a resin incompatible with the norbornene-based resin at a ratio from 5 to 30% by weight relative to a total solid content of the peelable layer.

2. The hologram transfer sheet according to claim 1, wherein the relief of the relief formation layer is a relief hologram and/or a diffraction grating.

3. The hologram transfer sheet according to claim 1, wherein a heat resistant antifriction layer is provided on a surface of the substrate on the side opposite to the peelable layer.

4. The hologram transfer sheet according to claim 1, wherein an adhesive layer is provided on the metal thin layer.

5. An intermediate transfer recording medium wherein a dye receiving layer is provided as an outermost layer on the metal thin layer of the hologram transfer sheet according to any one of claims 1, 2, 3 or 4.

* * * * *